United States Patent [19]

Sedy

[11] Patent Number: 5,531,458
[45] Date of Patent: Jul. 2, 1996

[54] FACE SEAL WITH ANGLED GROOVES

[75] Inventor: Josef Sedy, Mount Prospect, Ill.

[73] Assignee: Durametallic Corporation, Kalamazoo, Mich.

[21] Appl. No.: 480,932

[22] Filed: Jun. 7, 1995

Related U.S. Application Data

[63] Continuation of Ser. No. 230,090, Apr. 20, 1994, abandoned.

[51] Int. Cl.⁶ ............................................. F16J 15/34
[52] U.S. Cl. ............................................ 277/96.1
[58] Field of Search ............................ 277/27, 81 R, 277/96, 96.1

[56] References Cited

U.S. PATENT DOCUMENTS

| | | | |
|---|---|---|---|
| 3,109,658 | 11/1963 | Barrett et al. | 277/3 |
| 3,499,653 | 3/1970 | Gardner | 277/27 |
| 3,675,935 | 7/1972 | Ludwig et al. | 277/96.1 X |
| 3,767,212 | 10/1973 | Ludwig | 277/96 X |
| 4,212,475 | 7/1980 | Sedy | 277/96.1 |
| 4,972,986 | 11/1990 | Lipschitz | 277/96.1 X |
| 4,973,068 | 11/1990 | Lebeck | 277/96.1 X |
| 5,058,905 | 10/1991 | Nosowicz et al. | 277/65 |
| 5,172,918 | 12/1992 | Pecht et al. | 277/96.1 |
| 5,180,173 | 1/1993 | Kimura et al. | 277/96.1 |

FOREIGN PATENT DOCUMENTS

| | | | |
|---|---|---|---|
| 0470409 | 2/1992 | European Pat. Off. | 277/96.1 |
| 1964150 | 7/1970 | Germany | 277/96.1 |
| 2-236068 | 9/1990 | Japan | 277/96.1 |
| 3-140672 | 6/1991 | Japan | 277/96.1 |

*Primary Examiner*—William A. Cuchlinski, Jr.
*Assistant Examiner*—John L. Beres
*Attorney, Agent, or Firm*—Flynn, Thiel, Boutell & Tanis

[57] ABSTRACT

A fluid seal of the type employing a groove pattern on one of the opposed seal faces, which groove pattern includes a series of angled grooves formed in and positioned circumferentially around one of the seal faces, with the configuration of the grooves and of the flat face lands defined between adjacent grooves being configured to improve the squeeze film effect over the lands and between the opposed faces. The angled grooves are formed such that the sides of adjacent grooves extend generally in parallelism with one another so that the intermediate land area between adjacent grooves maintains a substantially constant width, even adjacent the radially inner ends of the grooves.

4 Claims, 2 Drawing Sheets

5,531,458

FACE SEAL WITH ANGLED GROOVES

This application is a continuation of U.S. Ser. No. 08/230 090, filed Apr. 20, 1994, now abandoned.

FIELD OF THE INVENTION

This invention relates to sealing devices for rotating shafts, wherein a sealed fluid is employed to generate hydrostatic-hydrodynamic forces between opposed interacting face-type sealing elements, one stationary and the other rotating, which forces provide for slight separation and non-contacting operation of the sealing elements to minimize face wear and friction power losses while maintaining low fluid leakage.

BACKGROUND OF THE INVENTION

Rotary fluid film face seals, also called gap or non-contacting face seals, are usually applied to high-speed and/or high-pressure rotating equipment wherein the use of ordinary mechanical face seals with face contact would result in excessive heat generation and wear. Non-contacting operation avoids this undesirable face contact at times when the shaft is rotating above a certain minimum speed, which is called a lift-off speed.

There are various ways of accomplishing the above non-contacting operation. One of the more commonly used ways includes the formation of a shallow angled (i.e. spiral) groove pattern in one of the sealing faces. The sealing face opposite the grooved face is relatively flat and smooth. The face area where these two sealing faces define a sealing clearance is called the sealing interface.

The above-mentioned angled groove pattern on one of the sealing faces normally extends inward from the outer circumference and ends at a particular face diameter called the groove diameter, which is larger then the inner diameter of the seal interface. The non-grooved area between the groove diameter and the inner interface diameter serves as a restriction (i.e. a dam) to fluid outflow. Fluid delivered by the groove pattern must pass through this restriction and it can do so only if the sealing faces separate. The way this works is through pressure build-up. Should the faces remain in contact, fluid will be compressed just ahead of the restriction, thus building up pressure. The pressure causes a separation force which eventually becomes larger than the forces that hold the faces together. In that moment the sealing faces separate and allow the fluid to escape. During operation of the seal, an equilibrium establishes itself between fluid inflow through angled groove pumping and fluid outflow through face separation. Face separation is therefore present as long as the seal is operating, which means as long as one face is rotating in relation to the opposite face.

However, angled groove pumping is not the only factor that determines the amount of the separation between the sealing faces. Just as the angled grooves are able to drive the fluid into the non-grooved portion of the sealing interface past the groove diameter, so can the pressure differential. If enough of a pressure difference exists between the grooved end of the interface and the non-grooved end, fluid will also be forced into the non-grooved portion of the interface, thereby separating the faces and forming the clearance.

Both ways in which clearance can be formed between the sealing faces, one with speed of rotation, the other with pressure differential, are distinct and separate, even though the effects of both combine on the operating seal. If there is no pressure difference and the seal face separation occurs strictly due to face rotation, forces due to fluid flow are hydrodynamic if the fluid sealed is a liquid, and aerodynamic if the fluid sealed is a gas.

On the other hand, if there is no mutual rotation between the two sealing faces and face separation is strictly the consequence of pressure differential between both ends of the sealing interface, forces due to fluid flow are hydrostatic if the fluid sealed is a liquid, and aerostatic if the fluid sealed is a gas. In the following, the terms hydrostatic and hydrodynamic are used for both liquid and gas effects since these latter terms are more conventionally used when describing both liquid and gas seals.

A typical spiral groove seal needs to provide acceptable performance in terms of leakage and the absence of face contact during all regimes of seal operation. It must do so not only at top speed and pressure, but also at standstill, at start-up, during acceleration, at periods of equipment warm-up or at shutdown. At normal operating conditions, pressure and speed vary constantly, which results in continuous adjustments to the running clearance. These adjustments are automatic; one of the key properties of angled groove seals is their self-adjustment capability. On change in speed or pressure, the face clearance adjusts automatically to a new set of conditions. However, the operating envelope of speeds and pressures is usually very wide and a seal design of necessity must be a compromise. For its performance to be acceptable at near-zero speed or pressure, it is less than optimum at operating speed and pressure. This is simply due to the fact that, both in terms of pressure and speed, the seal has to be brought up to operating conditions from zero speed and zero pressure differential.

While known fluid seals have attempted to provide both hydrodynamic and hydrostatic sealing properties, nevertheless the known seals have still been deficient with respect to their ability to optimize these properties.

More specifically, in known groove patterns, the angled grooves have typically been formed such that the width ratio between the grooves and the lands adjacent the grooves in a circumferential direction remains relatively constant as the grooves angle inwardly from the outer diameter. This thus necessarily results in the flat intermediate face or land area between adjacent grooves being of decreasing area (i.e., width) as these lands angle inwardly from the outer diameter. This progressive decrease in the width of the land area as the land angles inwardly from the outer diameter decreases the squeeze film effect in the fluid which flows over the land during operation, and thus decreases the thrust bearing support the lands provide with respect to avoiding seal face contact under conditions of high speed rotation.

Accordingly, it is on object of this invention to provide an improved fluid seal of the type employing a groove pattern on one of the opposed seal faces, which groove pattern includes a series of angled grooves formed in and positioned circumferentially around one of the seal faces, with the configuration of the grooves and of the flat face lands defined between adjacent grooves being configured so as to improve the squeeze film effect over the lands and between the opposed faces to thus provide improved hydrodynamic sealing characteristics, particularly under conditions of high speed.

More specifically, in the improved seal of this invention, the angled grooves are preferably formed such that the sides of adjacent grooves extend generally in parallelism with one another so that the intermediate land area between adjacent grooves maintains a substantially constant width, even adjacent the radially inner ends of the grooves, to maximize squeeze film effects in the fluid which flows over the lands to thus enhance the thrust bearing support these lands provide for avoidance of seal face contact at or near high speed of rotation.

Other objects and purposes of the invention will be apparent to persons familiar with seals of this general type upon reading the following specification and inspecting the accompanying drawings.

Figure 1:
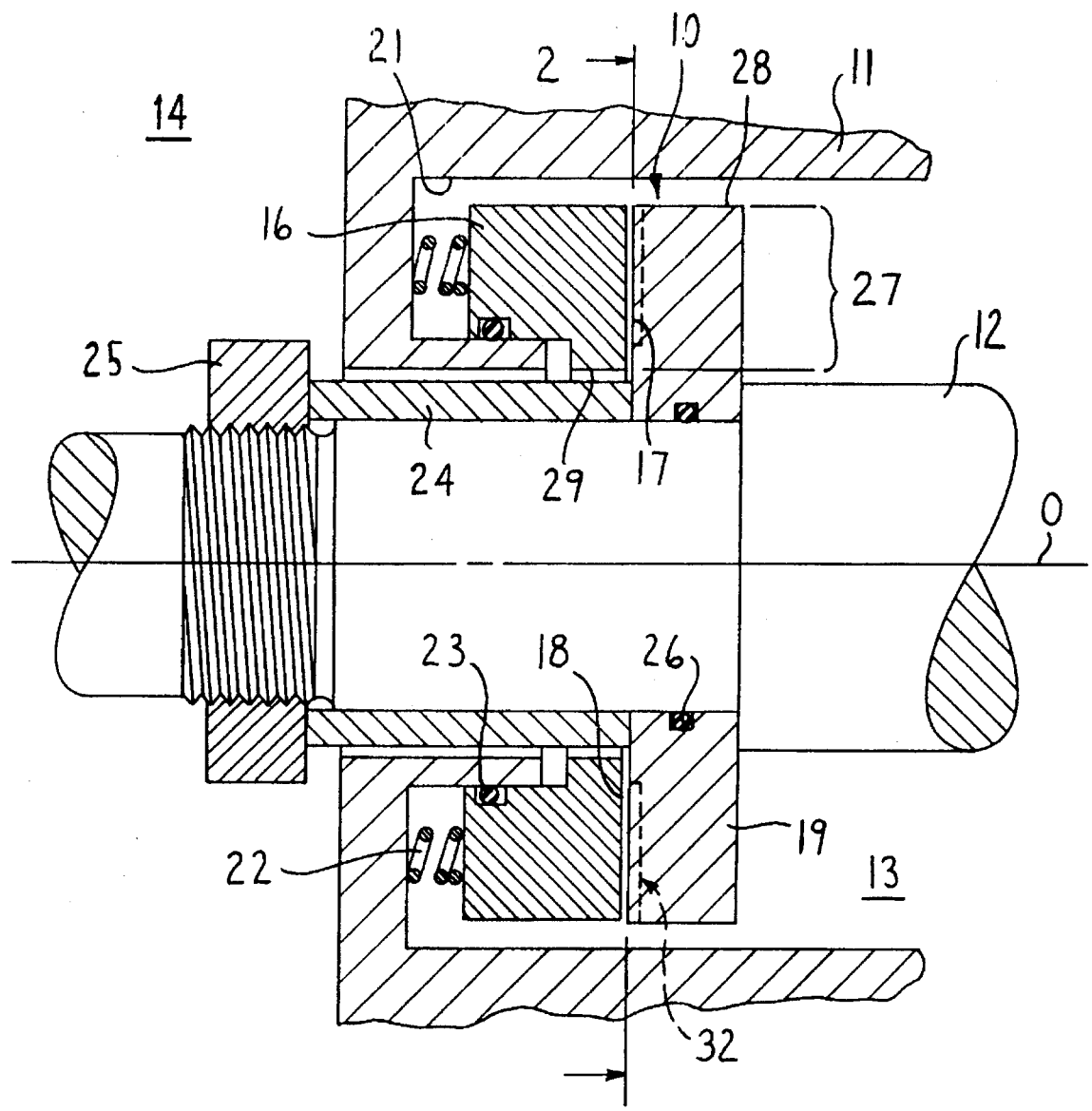
FIG. 1 is a fragmentary central sectional view illustrating a generally conventional fluid face seal arrangement, such as a grooved face seal, associated with a rotating shaft.

Certain terminology will be used in the following description for convenience in reference only, and will not be limiting For example, the words "upwardly", "downwardly", "rightwardly" and "leftwardly" will refer to directions in the drawings to which reference is made. The words "inwardly" and "outwardly" will refer to directions toward and away from, respectively, the geometric center of the assembly and designated parts thereof. Said terminology will include the words specifically mentioned, derivatives thereof, and words of similar import.

DETAILED DESCRIPTION

Figure 2:
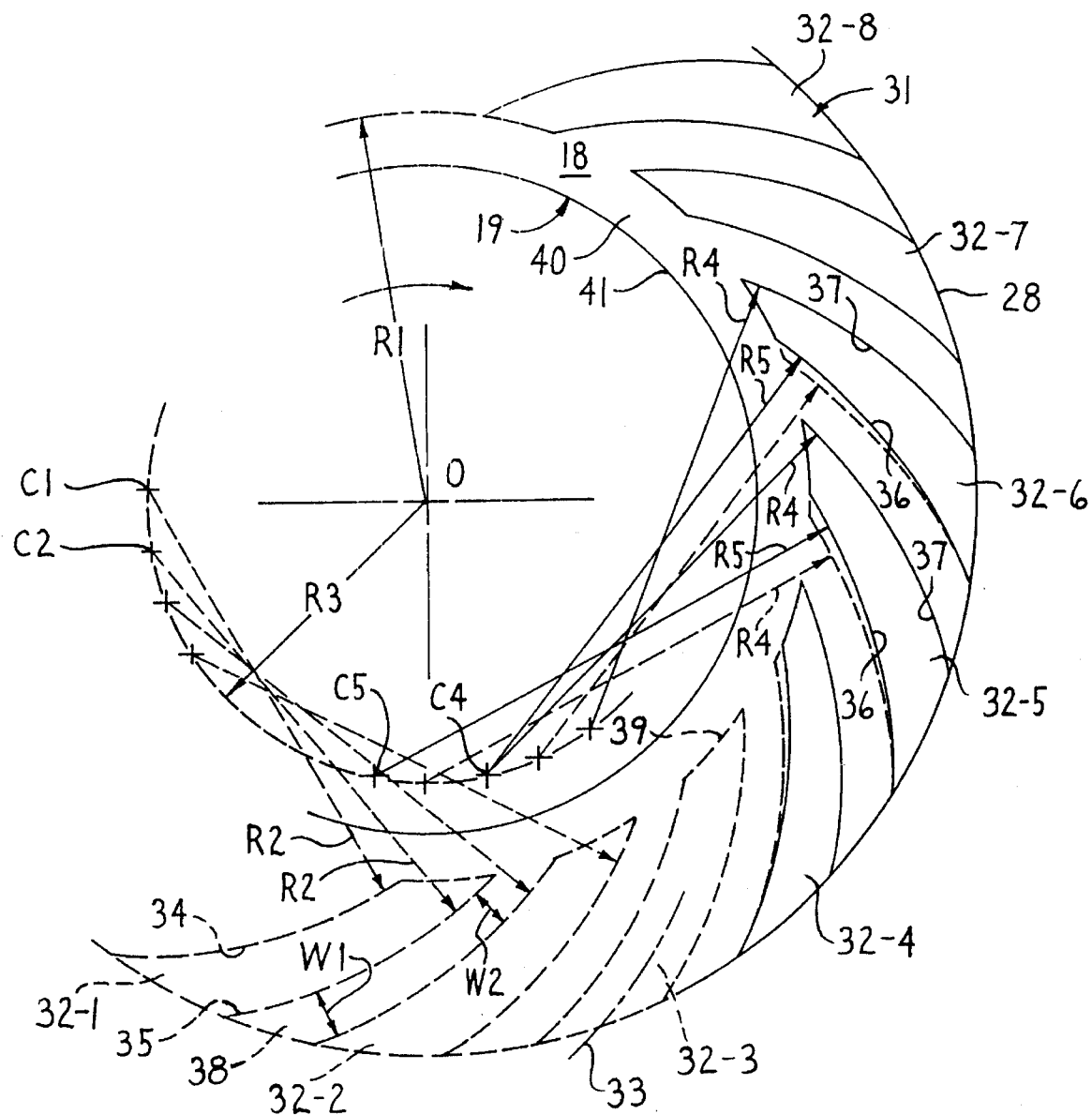
FIG. 2 is a fragmentary enlarged view taken generally along line 2—2 in FIG. 1 and illustrating the groove pattern associated with the face of the rotating seal ring both according to the prior art and according to the present invention.

Referring to FIG. 1, there is shown a typical grooved face seal assembly 10 and its environment. This environment comprises a housing 11 and a rotatable shaft 12 extending through the housing. The seal assembly 10 is applied to seal a fluid (such as pressurized gas) within the annular space 13 and to restrict its escape into the environment at 14. Basic components of the seal assembly include an annular, axially movable but non-rotatable sealing ring 16 (a stator) having a radially extending flat seal face 17 in opposed sealing relationship with a radially extending flat seal face 18 of an annular rotatable sealing ring 19 (a rotor) which is non-rotatably mounted on the shaft 12. Ring 19 normally rotates in the direction of the arrow (FIG. 2). The sealing ring 16 is located within cavity 21 of housing 11 and held substantially concentric to rotatable sealing ring 19. Between housing 11 and the sealing ring 16 is a conventional anti-rotation device (not shown) for preventing rotation of ring 16, as well as a plurality of springs 22 spaced equidistantly around the cavity 21. Springs 22 urge the sealing ring 16 toward engagement with the sealing ring 19. An O-ring 23 seals the space between the sealing ring 16 and the housing 11. The sealing ring 19 is retained in the axial position by a sleeve 24 which is concentric with and locked on the shaft 12, such as by locknut 25 threaded on shaft 12 as shown. O-ring seal 26 precludes leakage between the sealing ring 19 and the shaft 12.

The radially extending face 18 of the sealing ring 19 and radially extending face 17 of sealing ring 16 are in sealing relationship, and define an annular contact area 27 therebetween, this being the seal interface. This seal interface 27 is defined by a surrounding outer diameter 28 of ring 19 and an inner diameter 29 of ring 16, these being the diameters exposed to the high and low pressure fluid respectively in the illustrated embodiment. In operation, a very narrow clearance is maintained between the seal faces 17–18, due to a fluid film as generated by a groove pattern (as described below) formed in the sealing face 18 of the sealing ring 19. Alternately, the groove pattern can be formed in the sealing face 17 of the sealing ring 16 and still be effective. Said narrow clearance is maintained by the fluid between the seal faces which prevents generation of friction heat and wear, but the narrow clearance limits outflow of the sealed fluid from the space 13 into the region 14.

Referring now to FIG. 2, there is illustrated the sealing face 18 of the ring 19, which face has a groove arrangement 31 formed therein. The groove arrangement 31 includes grooves formed according to the prior art and such are designated by dotted lines so as to permit comparison with grooves formed according to the present invention, which grooves are indicated by solid lines in FIG. 2.

The groove arrangement 31 is defined by a plurality of angled grooves 32 which are formed in the face 18 and substantially uniformly angularly spaced relationship therearound. These grooves 32 are all angled such that they open radially inwardly from the outer diameter 28 in such fashion that the grooves simultaneously project circumferentially and radially inwardly, and have an angled relationship with respect to both the circumferential and radial directions of the seal face. The angled groove 32, as represented by the centerline 33, normally opens inwardly from the outer diameter 28 at an acute angle relative to a tangent to the outer diameter, which acute angle e may be in the neighborhood of about 15°.

Each angled groove 32 is defined by a pair of side or edge walls 34 and 35. These edge walls 34 and 35 angle radially inwardly so as to terminate at an inner groove diameter 39 defined by a radius designated R1 as generated about the centerpoint O of the face ring. The opposed side walls 34–35 may assume different configurations including straight lines, circular arcs or spiral profiles, but often are formed as circular arcs for convenience in curve generation, with the leading side wall 34 being of a convex configuration and the opposed trailing wall 35 being of a concave configuration.

The face regions defined between circumferentially adjacent grooves 32 constitute flat face portions 38 commonly known as lands, which lands 38 extend circumferentially between the concave edge 35 of one groove and the adjacent convex edge 34 of an adjacent groove, with the lands 38 angling inwardly from the outer diameter 28 until reaching the inner groove diameter 39. The seal face also includes an annular flat face portion 40 which extends radially inwardly from the inner groove diameter 39 to the minimum interface contact diameter 41 as defined between the opposed seal faces 18 and 19. This annular face region 40 is free of grooves, and is commonly referred to as a dam.

As to the configurations of the grooves 32 according to conventional forming techniques when such grooves are of circular configuration, and referring to the groove 32-1 of FIG. 2 for purposes of illustration, the convex leading edge 34 of the groove is generated about a radius R2 having a centerpoint C1 located on a circular locus which is generated on a radius R3 about the centerpoint O. In similar fashion, the concave trailing edge 35 of the groove 32-1 is also generated about the same radius R2, although in this case the radius has a centerpoint C2 which is spaced from the centerpoint C1 but is located on the same circular locus.

Accordingly, in the prior art technique wherein the groove edges are formed by circular arcs, all of the groove edges (including both the convex and concave edges) are all generated by circular arcs of equal radii, with the convex and concave edges of each groove having separate centerpoints such as C1 and C2, with the centerpoints for the plurality of grooves defining a circular locus generated about the ring centerpoint O.

With the grooves formed in the manner described above, the land 38 as defined between each adjacent pair of grooves has a progressively decreasing width as the land angles inwardly. That is, the width of the land extending transversely from the convex edge of one groove to the concave edge of an adjacent groove progressively decreases as the land angles radially inwardly. For example, the width $W_1$ of the land 38 adjacent the outer diameter 28 will be greater than the width $W_2$ of the land adjacent the inner ends of the grooves, with the land width progressively decreasing as the land projects radially inwardly. There is thus less land area in the vicinity of the radially inner ends of the grooves, and hence less land area for cooperation with the opposed seal face 18 so as to create a desired squeeze fluid film therebetween, particularly at high rotational speed operations.

Accordingly, the present invention forms the grooves in the manner illustrated by solid lines in FIG. 2 so as to maximize the land area, and to improve the squeeze fluid film characteristics between the lands 38 and the opposed face 18, particularly under high speed operating conditions.

Again referring to FIG. 2, the seal face 19 is again provided with a groove pattern therein formed by a circumferentially spaced plurality of grooves 32 (specifically the grooves individually designated 32-4 through 32-8) which angle circumferentially and radially inwardly from the outer diameter 28 so as to terminate at the inner groove diameter 39.

Each of the grooves 32 according to the present invention, and referring to the groove 32-5 or 32-6 as exemplary, is defined by opposed leading and trailing side edges 36 and 37 which are again respectively convex and concave edges and are generated on a circular profile. For example, the concave trailing edge 37 of each groove as illustrated by the groove 32-5 is generated about a radius such as R4 having a centerpoint C3 disposed on a locus or circular path generated about the ring center 0, the locus or path for the improved grooves of this invention as illustrated in FIG. 2 being the same as the path for the prior art grooves, although it will be recognized that the radius for this path will be individually selected in according with desired design parameters.

The other or convex leading edge of each groove is similarity generated on a circular radius and, as illustrated by the groove 32-6 of FIG. 2, the concave edge is generated about a radius R5 which is greater than the radius R4 used for generating the concave edge 36 of adjacent groove 32-5. Further, the radius R5 for generating the convex edge of one groove (such as 32-6) is generated about the same centerpoint C4 as is used for the shorter radius R4 which generates the concave edge 37 of the circumferentially adjacent groove (such as the groove 32-5).

Thus, the concave and convex edges of adjacent grooves, which edges define the land 38 therebetween, are generated about different length radii which have a common centerpoint. The intermediate land 38 thus has a uniform or constant transverse width throughout the elongate extent thereof as the land angles inwardly from the outer diameter 28 to the inner groove diameter 39. This in particular results in the land 38 being of increased area, particularly adjacent the radially inner ends of the grooves, this being depicted by the overlapping comparison illustrated by the solid and dotted line relationships appearing relative to the grooves 32-4 and 32-5 in FIG. 2. The increased area of the lands 38, particularly adjacent the inner ends of the grooves, thus provides for creation of an improved squeeze fluid film between the lands and the opposed seal face 18, particularly under conditions of high speed rotation, to thus minimize contact and frictional wear such as due to thermal distortions and the like.

Accordingly, in the improved groove configuration for the face of the seal ring, such as depicted by solid lines in FIG. 2, the concave and convex edges of each groove are defined of circular configurations generated about different radii R4 and R5 respectively, with the radius R4 of the concave edge being smaller than the radius R5 of the convex edge, and with the two centerpoints C4 and C5 of these radii which define the opposite edges of a single groove being angularly spaced apart on a common circular path generated about the centerpoint O.

However, as to the convex and concave edges of two adjacent grooves, namely the adjacent concave and convex edges which are separate by an intermediate land 38, while these two edges are again generated about the two radii R4 and R5 of different magnitudes, nevertheless in this instance the two radii are generated about a common (i.e. a single) centerpoint located on the circular path or locus. Hence, the number of centerpoints defining the circular path or locus equals the number of grooves formed in the seal face, with each centerpoint functioning as a center for generation of two different length radii, one being for the convex edge of one groove and the other being for the concave edge of an adjacent groove. However, each groove itself is generated about two different length radii each having a different centerpoint. Thus, for example, if the face ring has a groove pattern which includes 20 grooves, then the circular path or locus will define 20 centerpoints each functioning to generate two groove edges, namely a concave edge on one groove and a convex edge on a circumferentially adjacent groove so that the two edges thus generated are separated by a single land 38 which is of uniform transverse width throughout the radially inward extent thereof.

The depth of the grooves will be in accordance with known and conventional design parameters and techniques.

In operation, the high pressure fluid surrounding the outer diameter 28 enters into the grooves 32, and is then restricted from further radial inflow by the land or dam 40. When the seal arrangement operates, the pressurized fluid in the grooves 32 is effectively pumped out over the lands 38 and dam 40 to create and increase the dimension of the gap or clearance between the opposed faces 17–18 so as to permit relatively high speed rotation between the seal faces while effectively avoiding or greatly minimizing any direct frictional contact therebetween.

Reference is made to my copending applications Ser. Nos. 08/115 154 and 08/115 153, both filed Sep. 1, 1993, respectively, which applications discuss hydrostatic and hydrodynamic seal principles of grooved face seals in greater detail, and the disclosures of these latter copending applications, in their entireties, are incorporated herein by reference.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a gas face seal arrangement of the noncontact type, said seal arrangement including first and second annular seal members having opposed and generally flat annular seal faces disposed in directly adjacent and opposed relationship, said seal members being disposed in generally concentric relationship to a shaft, one said seal member being generally nonrotatably secured relative to the shaft and the other seal member being generally nonrotatably secured relative to a surrounding housing, the annular seal members being relatively axially urged toward one another so that the opposed seal faces create a seal interface between regions disposed radially outwardly and inwardly of the seal faces, one of said seal faces having a plurality of arcuate grooves formed therein in generally uniformly and circumferentially spaced relation therearound, said grooves projecting from one diameter of the seal interface and terminating at an intermediate diameter which is disposed radially between inner and outer diameters of the seal interface, each said groove being angled circumferentially and radially and defined by two side edges each being of circular configuration generated about a predetermined radius, one said side edge being a convex leading edge and the other said side edge being a concave trailing edge, and said seal face defining thereon a flat face land between each circumferentially-adjacent pair of said grooves, comprising the improvement wherein the convex leading edge and the concave trailing edge of each said groove are respectively generated about first and second radii which are of different lengths and wherein the concave trailing edge of one groove as generated about said second radius and the convex leading edge of the next adjacent groove as generated about said first radius are both generated about a common centerpoint so that the land between adjacent grooves is of a uniform transverse width throughout the angled extent thereof.

2. A seal arrangement according to claim 1, wherein said first radius is greater than said second radius, and wherein said first and second radii as associated with a respective said groove are generated about respective first and second centerpoints which are angularly spaced apart but disposed on a common circular locus generated about a centerpoint of the respective seal face.

3. A seal arrangement according to claim 2, wherein said grooves angle circumferentially and radially inwardly from the outer diameter of the seal interface.

4. A seal arrangement according to claim 1, wherein said grooves angle circumferentially and radially inwardly from the outer diameter of the seal interface.

* * * * *